US011216960B1

(12) United States Patent
Huang et al.

(10) Patent No.: US 11,216,960 B1
(45) Date of Patent: Jan. 4, 2022

(54) IMAGE PROCESSING METHOD AND SYSTEM

(71) Applicant: Alipay Labs (Singapore) Pte. Ltd., Singapore (SG)

(72) Inventors: Jiangbo Huang, Hangzhou (CN); Yan Xu, Hangzhou (CN)

(73) Assignee: ALIPAY LABS (SINGAPORE) PTE. Ltd., Singapore (SG)

(*) Notice: Subject to any disclaimer, the term of this patent is extended or adjusted under 35 U.S.C. 154(b) by 0 days.

(21) Appl. No.: 17/336,567

(22) Filed: Jun. 2, 2021

(30) Foreign Application Priority Data

Jul. 1, 2020 (SG) .......................... 10202006358X (51) Int. Cl.
| | | |
|---|---|---|
| *G06K 9/00* | (2006.01) | |
| *G06T 7/30* | (2017.01) | |
| *G06T 3/60* | (2006.01) | |
| *G06T 7/70* | (2017.01) | |
| *G06T 3/00* | (2006.01) | |

(Continued)

(52) U.S. Cl.
CPC .............. *G06T 7/30* (2017.01); *G06K 9/6217* (2013.01); *G06N 3/08* (2013.01); *G06T 3/0093* (2013.01); *G06T 3/60* (2013.01); *G06T 7/70* (2017.01); *G06T 2207/20081* (2013.01); *G06T 2207/20084* (2013.01); *G06T 2207/30176* (2013.01)

(58) Field of Classification Search
CPC ................................................. G06K 9/00442
See application file for complete search history.

(56) References Cited

U.S. PATENT DOCUMENTS

| | | | |
|---|---|---|---|
| 5,901,253 A | 5/1999 | Tretter | |
| 6,298,157 B1 * | 10/2001 | Wilensky | ............... G06T 3/403 |
| | | | 382/199 |

(Continued)

FOREIGN PATENT DOCUMENTS

| | | |
|---|---|---|
| CN | 109241974 | 1/2019 |
| CN | 109961064 | 7/2019 |
| JP | H08263659 | 10/1996 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Mahendran et al, "3D Pose Regression using Convolutional Neural Networks," IEEE International Conference on Computer Vision Workshops, Oct. 29, 2017, 9 pages.

(Continued)

*Primary Examiner* — Hadi Akhavannik
(74) *Attorney, Agent, or Firm* — Fish & Richardson P.C.

(57) ABSTRACT

Disclosed are computer-implemented methods, non-transitory computer-readable media, and systems for image processing. One computer-implemented method includes determining a rotated angle of an identification (ID) document image, where the rotated angle corresponds to an angle between a bottom edge of the ID document image and an x-axis. The ID document image is rotated based on the rotated angle, where an angle is defined between the bottom edge of the rotated ID document image and the x-axis, and where a value of the angle is within a predefined range. Image regression is performed on the rotated ID document image to obtain coordinates of four corner points of the rotated ID document image. Image alignment is performed on the rotated ID document image based on the coordinates of four corner points of the rotated ID document image.

20 Claims, 4 Drawing Sheets

(51) Int. Cl.
*G06N 3/08* (2006.01)
*G06K 9/62* (2006.01)

(56) References Cited

U.S. PATENT DOCUMENTS

| | | | |
|---|---|---|---|
| 9,020,298 B2* | 4/2015 | Downing | G06T 11/60 |
| | | | 382/282 |
| 10,339,374 B1 | 7/2019 | Pribble et al. | |
| 2006/0147093 A1* | 7/2006 | Sanse | B42D 25/00 |
| | | | 382/115 |
| 2009/0231639 A1 | 9/2009 | Iwayama | |
| 2013/0273968 A1* | 10/2013 | Rhoads | H04W 4/50 |
| | | | 455/556.1 |
| 2016/0037008 A1* | 2/2016 | Mori | H04N 1/00748 |
| | | | 358/518 |
| 2017/0351909 A1* | 12/2017 | Kaehler | G06T 19/006 |
| 2018/0032997 A1* | 2/2018 | Gordon | G06Q 30/0269 |
| 2018/0218497 A1* | 8/2018 | Golden | G06T 7/11 |
| 2019/0220660 A1* | 7/2019 | Cali | G06K 9/00442 |
| 2019/0311227 A1* | 10/2019 | Kriegman | G06K 9/00442 |
| 2021/0104114 A1* | 4/2021 | Eager | G07F 17/3239 |

OTHER PUBLICATIONS

Nakamoto, "Bitcoin: A Peer-to-Peer Electronic Cash System," www.bitcoin.org, 2005, 9 pages.

ODSC [online], "Using the CNN Architecture in Image Processing," Jan. 9, 2020, retrieved Jun. 7, 2021, retreived from URL<https://opendatascience.com/using-the-cnn-architecture-in-image-processing/>, 11 pages.

Shimobaba et al, "Convolutional Neural Network-Based Regression for Depth Prediction in Digital Holography," IEEE 27th International Symposium on Industrial Electronics, Jun. 15, 2018, 4 pages.

Wang et al., "HCR-Net: A Hybrid of Classification and Regression Network for Object Pose Estimation," Proceedings of 27th International Joint Conference on Artificial Intelligence, Jul. 1, 2018, 7 pages.

EP Extended Search Report in European Application No. 21179132.2, dated Nov. 26, 2021, 7 pages.

Baltruschat et al, "Orientation regression in hand radiographs: a transfer learning approach," Progress in Biomedical Optics and Imaging SPIE, Mar. 2, 2018, 8 pages.

Schneider et al, "Robust Document Warping with Interpolated Vector Fields," IEEE Xplore, Sep. 30, 2007, 5 pages.

* cited by examiner

IMAGE PROCESSING METHOD AND SYSTEM

CROSS-REFERENCE TO RELATED APPLICATIONS

This application claims priority to Singapore Patent Application No. 10202006358X, filed on Jul. 1, 2020, which is hereby incorporated by reference in its entirety.

TECHNICAL FIELD

The present specification relates broadly, but not exclusively, to an image processing method and to an image processing system.

BACKGROUND electronic-Know Your Customer (eKYC) is a digital due diligence process performed by a business entity or service provider to verify the identity of its customers to prevent falsification of identity. eKYC processes typically include a series of checks conducted at the initial stage of the relationship with the customers to verify their identities. Many eKYC processes involve potential customers submitting photographs of their official identification (ID) documents, e.g. ID card, driving license, passport, etc. The photographs may then be analyzed to verify the customers' identities.

In a typical eKYC process, a customer is required to take a photograph of his/her ID document. Image processing methods are then implemented on the captured image. Current image processing technologies are effective for implementation on well-oriented ID document images. However, ID document images in the captured images provided by customers may be misoriented.

A need therefore exists to improve the manner in which an ID document image can be processed.

SUMMARY

Embodiments seek to provide an image processing method and an image processing system which involve using multiple steps to process ID document images that are misoriented. Misoriented ID document images may refer to ID document images with their bottom edges misaligned with an x-axis. The image processing method and system may provide higher accuracy in obtaining an aligned ID document image. In particular, by rotating the ID document image such that the bottom edge of the ID document image is approximately aligned with an x-axis and subsequently performing image alignment on the rotated ID document image, the accuracy of the image processing method and system may be increased. Further, smaller model(s) can be used for the image processing method and system, therefore the processing speed may also be increased.

According to one embodiment, there is provided an image processing method, comprising: determining a rotated angle of an identification (ID) document image, wherein the rotated angle corresponds to an angle between a bottom edge of the ID document image and an x-axis; rotating the ID document image based on the determined rotated angle, such that an angle between the bottom edge of the rotated ID document image and the x-axis is within a predefined range; performing image regression on the rotated ID document image to obtain coordinates of four corner points of the rotated ID document image; and performing image alignment on the rotated ID document image based on the obtained coordinates of four corner points of the rotated ID document image.

According to another embodiment, there is provided an image processing system, comprising: an angle determining device to determine a rotated angle of an identification (ID) document image, wherein the rotated angle corresponds to an angle between a bottom edge of the ID document image and an x-axis; an image rotation device to rotate the ID document image based on the determined rotated angle, such that an angle between the bottom edge of the rotated ID document image and the x-axis is within a predefined range; an image regression device to perform image regression on the rotated ID document image to obtain coordinates of four corner points of the rotated ID document image; and an image alignment device to perform image alignment on the rotated ID document image based on the obtained coordinates of four corner points of the rotated ID document image.

BRIEF DESCRIPTION OF THE DRAWINGS

Embodiments are provided by way of example only, and will be better understood and readily apparent to one of ordinary skill in the art from the following written description, read in conjunction with the drawings, in which.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

electronic-Know Your Customer (eKYC) is a digital due diligence process performed by a business entity or service provider to verify the identity of its customers to prevent falsification of identity. Authentication can be considered as a form of fraud detection in which legitimacy of users are verified and potential fraudsters may be detected before fraudulent acts are carried out. Effective authentication can enhance data security of systems so that digital data is protected from unauthorized users.

In a typical eKYC process, a customer is required to take a photograph of his/her identification (ID) document, e.g. ID card, driving license, passport, etc. Image processing methods, e.g. optical character recognition methods, ID document anti-fraud methods, ID document classification methods, ID document quality check methods, etc. are then implemented on the captured image. The captured image may comprise an ID document image and a background image.

Current image processing technologies are effective for implementation on well-oriented ID document images. Well-oriented ID document images may refer to ID document images with their bottom edges approximately aligned with an x-axis. However, ID document images in the captured images provided by customers may be misoriented. Misoriented ID document images may refer to ID document images with their bottom edges misaligned with an x-axis. For example, the customers may not be holding their ID documents in a position with the bottom edges of the ID documents approximately aligned with an x-axis when they capture the ID document images. As such, current image processing methods may include a set of instructions for the alignment of the ID document images. However, if an ID document is rotated by a large angle (e.g. in an upside-down position) when the ID document image is captured, accuracy of the current image processing methods may be reduced. Therefore, an image processing method and system which can process misoriented ID document images may be useful.

Embodiments described in the present specification may involve an eKYC process that includes two general processes: a user enrollment process and a user verification process. In the user enrollment process, a user may be required to capture photograph(s) of his/her ID document for submission as user enrollment image(s).

Current image processing methods to process misoriented ID document images may include training a model using a large dataset of ID document images rotated at different angles. Data augmentation methods may also be implemented to produce more labelled data of ID document images rotated at different angles to form the training dataset. Further, image processing methods for rotating ID document images may be implemented to produce more ID document images rotated at different angles to form the training dataset. However, obtaining the large training dataset can be time consuming. Further, data augmentation methods and image processing methods for rotating ID document images may not produce good quality rotated ID document images. Hence, the accuracy of results produced by the trained model may be reduced. The training dataset comprising rotated ID document images in a big range of angles may also reduce the accuracy of results produced by the trained model. Accuracy may increase by using a larger convolutional neural network to train the model, however processing speed may reduce.

In order to process misoriented ID document images with higher accuracy and processing speed, an image processing method comprising multiple steps and its system thereof may be implemented. The image processing method and system may include determining a rotated angle of the ID document image, rotating the ID document image such that the bottom edge of the ID document image is approximately aligned with an x-axis, performing image regression on the rotated ID document image, and performing image alignment on the rotated ID document image. Further image processing methods, such as optical character recognition methods, ID document anti-fraud methods, ID document classification methods, ID document quality check methods, can then be implemented on the aligned ID document image.

The techniques described in the present specification produce one or more technical effects. The image processing method and system may provide higher accuracy in obtaining an aligned ID document image. In particular, by rotating the ID document image such that the bottom edge of the ID document image is approximately aligned with an x-axis, and subsequently performing image alignment on the rotated ID document image, accuracy of the image processing method may increase. By first rotating the ID document image such that the bottom edge of the ID document image is approximately aligned with an x-axis, the misoriented ID document image can be converted to a well-oriented ID document image. Image alignment can then be performed on the well-oriented ID document image. In this manner, the complexity of software routine(s) required to perform image processing on a misoriented ID document image may be reduced. Therefore, performance of the image processing method may improve and accuracy thereof may increase.

Further, the image processing method and system described in the present specification may provide increased processing speed. As mentioned, by implementing the image processing method and system, complexity of software routine(s) required to perform image processing on a mis-oriented ID document image may be reduced. Therefore, small model(s) can be used for the image processing method and system. For example, a small model can be used for determining the rotated angle of the ID document image and another small model can be used for performing image regression on the rotated ID document image. By using small model(s), processing speed of the image processing method and system may increase. With increased processing speed, the image processing method and system can be implemented for real-time applications and mobile phone applications.

Figure 1:
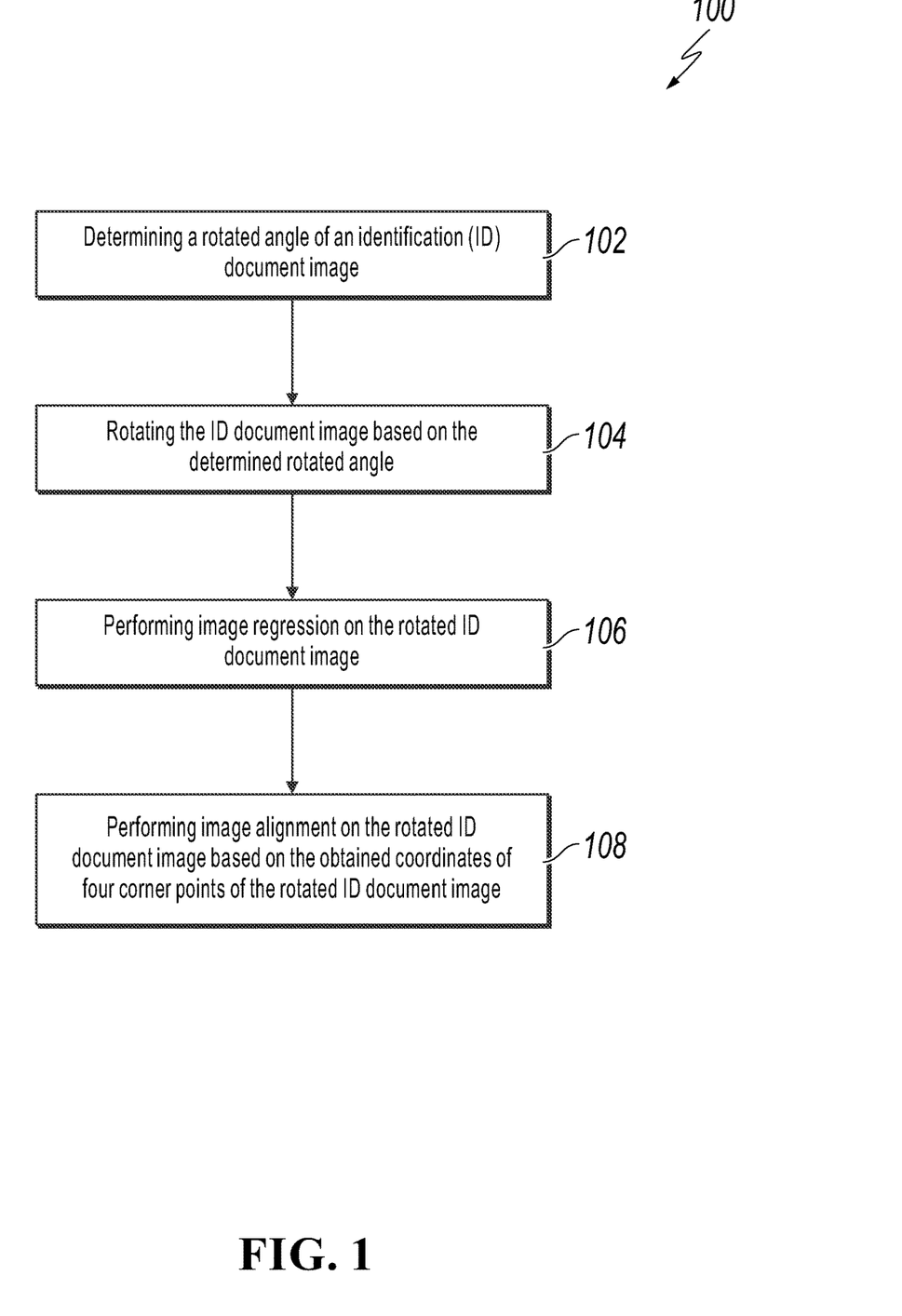
FIG. 1 is a flow chart illustrating an example of an image processing method, according to an embodiment.

FIG. 1 is a flow chart 100 illustrating an example of an image processing method, according to an embodiment. At step 102, a rotated angle of an identification (ID) document image is determined. The rotated angle corresponds to an angle between a bottom edge of the ID document image and an x-axis. At step 104, the ID document image is rotated based on the determined rotated angle, such that an angle between the bottom edge of the rotated ID document image and the x-axis is within a predefined range. At step 106, image regression is performed on the rotated ID document image to obtain coordinates of four corner points of the rotated ID document image. At step 108, image alignment is performed on the rotated ID document image based on the obtained coordinates of four corner points of the rotated ID document image.

According to one embodiment, the rotated angle of the ID document image may be determined using a trained angle determining model. The angle determining model may be trained using an angle determining regression task of an angle determining convolutional neural network (CNN). The accuracy of the determined rotated angle may be in the range of −10 degrees to 10 degrees. Determining the rotated angle of the ID document image can be a simple task, hence a small CNN may be used. As a non-limiting example, a CNN with 10 layers may be used. By using a small CNN, the processing speed of determining rotated angles of ID document images may increase. A graphics processing unit (GPU) may be used to further increase the processing speed.

For the trained angle determining model, the ID document image can be an input and the rotated angle of the ID document image is a possible output. The output value indicating the rotated angle of the ID document image may be a positive value or a negative value. For example, given a particular ID document image, the trained angle determining model may produce an output value of 30. The output value of 30 may indicate that the ID document image is rotated at an angle of 30 degrees with respect to the x-axis and in the counterclockwise direction. If the trained angle determining model produces an output value of −30, it may indicate that the ID document image is rotated at an angle of 30 degrees with respect to the x-axis and in the clockwise direction. In some implementations, the trained angle determining model may also produce output value(s) indicating rotation angles with respect to the y-axis and/or the z-axis.

Training dataset of ID document images rotated at different angles may be collected for training the angle determining model. Each training image may be labelled with its corresponding rotated angle. The training dataset can include captured images of ID documents rotated at different angles. The training dataset can also be obtained by implementing data augmentation methods on well-oriented ID document images. An image processing task can be executed to rotate the well-oriented ID document images by various angles. The rotated ID document images obtained in this manner may be collected for training the angle determining model. The image processing task to rotate the well-oriented ID document images can be execution of a function "rotate" in an open source library "pillow".

The selection of the angle determining convolutional neural network and the collection of the training dataset may be based on required accuracy of the image processing method and system.

As shown in step 104 of FIG. 1, the ID document image is rotated based on the determined rotated angle, such that an angle between the bottom edge of the rotated ID document image and the x-axis is within a predefined range. Rotation of the ID document image may be performed by executing a function "rotate" in an open source library "pillow". Defining a pivot point for rotation of the ID document image may not be required.

According to one embodiment, the predefined range of the angle between the bottom edge of the rotated ID document image and the x-axis may be between −10 degrees and 10 degrees.

As shown in step 106 of FIG. 1, image regression is performed on the rotated ID document image to obtain coordinates of four corner points of the rotated ID document image.

The image regression on the rotated ID document image may be performed using a trained document detection model. The document detection model may be trained using a document detection regression task of a document detection convolutional neural network.

For the trained document detection model, the rotated ID document image can be an input and the coordinates of four corner points of the rotated ID document image are possible outputs. The coordinates of four corner points of the rotated ID document image may be defined by x-coordinates and y-coordinates and may be represented by vectors of length 8.

Training dataset of ID document images may be collected for training the document detection model. Each training ID document image may be labelled with coordinates of its four corner points.

As shown in step 108 of FIG. 1, image alignment is performed on the rotated ID document image based on the obtained coordinates of four corner points of the rotated ID document image. For the image alignment, the rotated ID document image and the coordinates of four corner points of the rotated ID document image can be the inputs, and an aligned ID document image is a possible output.

According to one embodiment, performing image alignment on the rotated ID document image may comprise performing an image warping task. The image warping task may be performed using a warping function in opencv.

Figure 2:
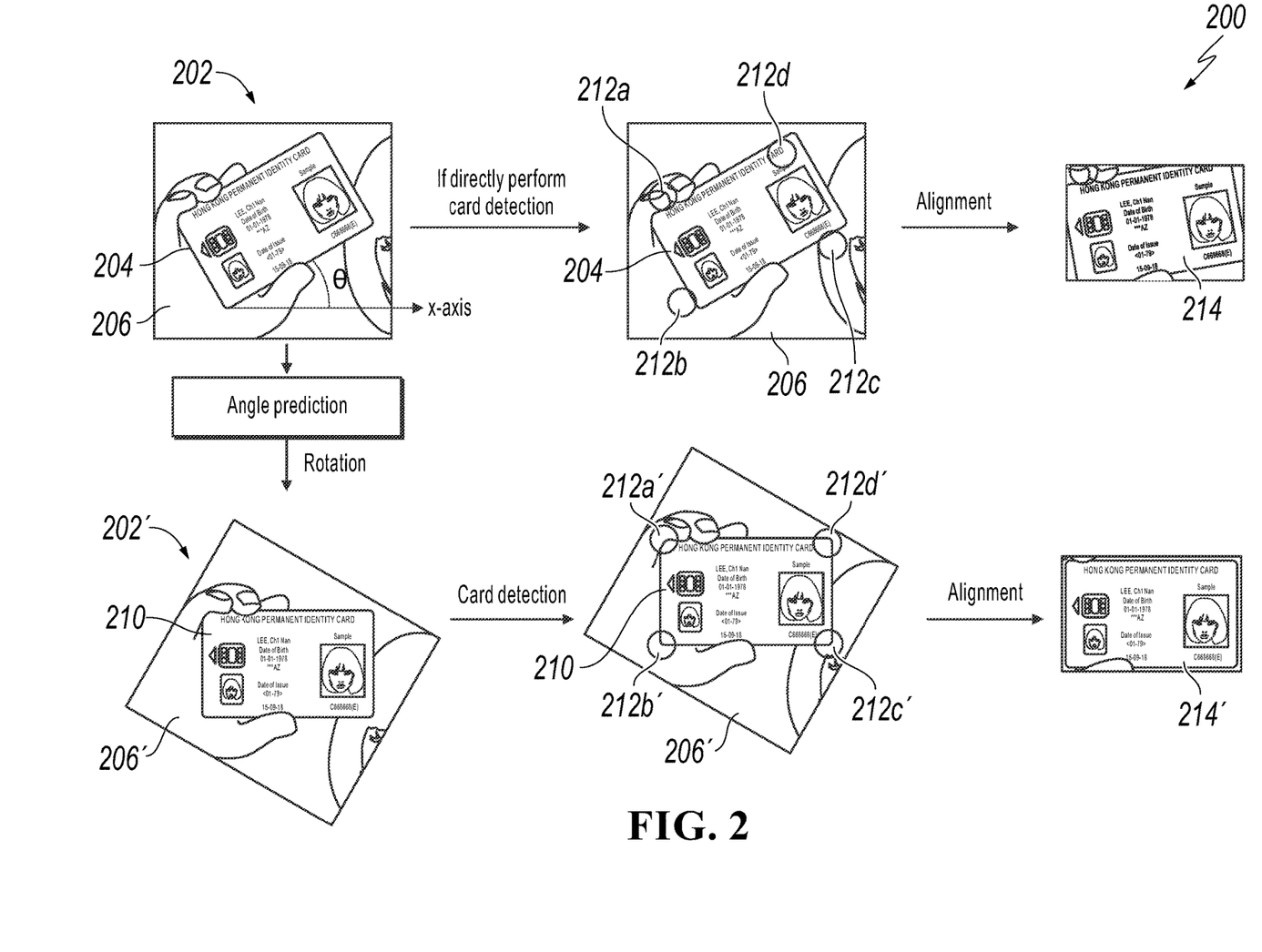
FIG. 2 is a schematic representation illustrating the example image processing method of FIG. 1.

FIG. 2 is a schematic representation 200 illustrating the example image processing method of FIG. 1. As mentioned above, in the user enrollment process of an eKYC process, a user may be required to capture photograph(s) of his/her ID document for submission as user enrollment image(s). The captured image 202 may comprise an ID document image 204 and a background image 206. As shown in FIG. 2, the ID document image 204 may be misoriented whereby the bottom edge of the ID document image 204 is at an angle θ larger than that of the predefined range with respect to the x-axis. The predefined range of the angle may be between −10 degrees and 10 degrees.

With reference to step 102 of FIG. 1, determination of the rotated angle of the ID document image 208 is performed. With reference to step 104 of FIG. 1, the ID document image 204 is rotated based on the determined rotated angle, such that an angle between the bottom edge of the rotated ID document image 210 and the x-axis is within a predefined range. In some implementations, rotating the ID document image 204 may include rotating the background image 206.

With reference to step 106 of FIG. 1, image regression is performed on the rotated ID document image 210 to obtain coordinates of four corner points 212a', 212b', 212c', 212d' of the rotated ID document image 210. With reference to step 108 of FIG. 1, image alignment is performed on the rotated ID document image 210 based on the obtained coordinates of four corner points 212a', 212b', 212c', 212d' of the rotated ID document image 210 to obtain an aligned ID document image 214'.

As mentioned above, the captured image 202 which a customer submit as a user enrollment image may comprise an ID document image 204 and a background image 206. In some implementations, rotating the ID document image 204 includes rotating the background image 206. In these implementations, the rotated background image 206' may be removed during image alignment. Performing image alignment on the rotated captured image 202' may comprise performing an image warping task which can remove the rotated background image 206'. The image warping task may be performed using a warping function in opencv.

As shown in FIG. 2, comparatively, image regression performed on the ID document image 204 directly without first rotating the ID document image 204 may produce less accurate results. The coordinates of four corner points 212a, 212b, 212c, 212d of the ID document image 204 obtained may not match the actual four corner points of the ID document image 204. As such, the aligned ID document image 214 obtained in this manner may be less accurate.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Figure 3:
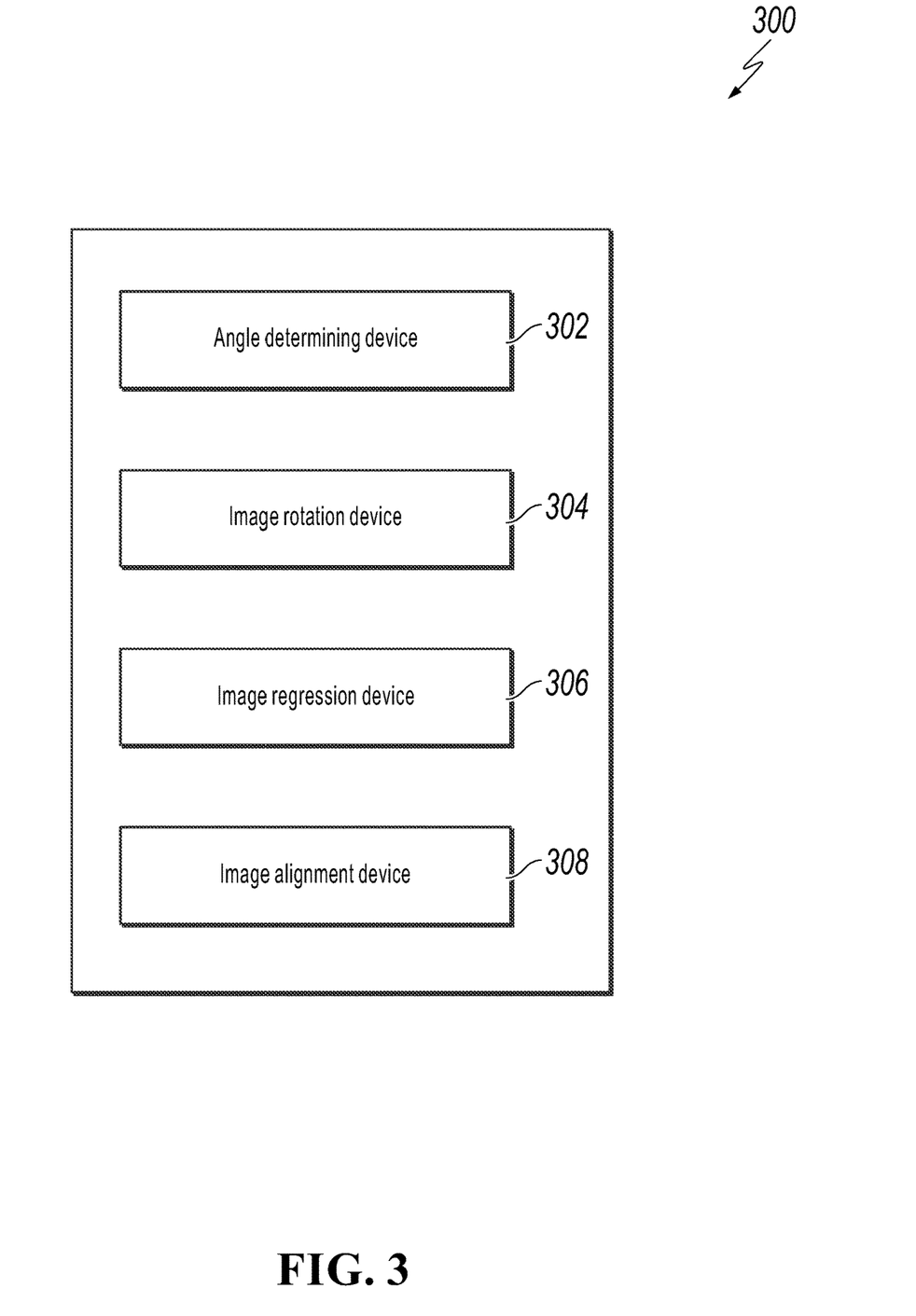
FIG. 3 is a schematic diagram illustrating an example of an image processing system, according to an embodiment.

FIG. 3 is a schematic diagram 300 illustrating an example of an image processing system, according to an embodiment. The image processing system comprises an angle determining device 302 to determine a rotated angle of an identification (ID) document image. The rotated angle corresponds to an angle between a bottom edge of the ID document image and an x-axis. The image processing system further comprises an image rotation device 304 to rotate the ID document image based on the determined rotated angle, such that an angle between the bottom edge of the rotated ID document image and the x-axis is within a predefined range. The image processing system also comprises an image regression device 306 to perform image regression on the rotated ID document image to obtain coordinates of four corner points of the rotated ID document image. Further, the image processing system comprises an image alignment device 308 to perform image alignment on the rotated ID document image based on the obtained coordinates of four corner points of the rotated ID document image.

The angle determining device 302 can be implemented using a processor for executing software routines of the trained angle determining model. Each of the image rotation device 304, the image regression device 306 and the image alignment device 308 can be implemented using the same processor or a different processor for executing another set of software routines to rotate the ID document image, for executing another set of software routines of the trained document detection model, and for executing another set of software routines to perform image alignment on the rotated ID document image, respectively.

According to one embodiment, the rotated angle of the ID document image may be determined using a trained angle determining model. The angle determining model may be trained using an angle determining regression task of an angle determining convolutional neural network.

The predefined range of the angle between the bottom edge of the rotated ID document image and the x-axis can be between −10 degrees and 10 degrees.

According to one embodiment, the image regression on the rotated ID document image may be performed using a trained document detection model. The document detection model may be trained using a document detection regression task of a document detection convolutional neural network.

The image alignment on the rotated ID document image may comprise an image warping task.

Some implementations may seek to provide a computer system for image processing. The computer system may comprise at least one processor, a non-transitory computer-readable storage medium coupled to the at least one processor and storing programming instructions for execution by the at least one processor. The programming instructions can instruct the at least one processor to determine a rotated angle of an identification (ID) document image. The rotated angle may correspond to an angle between a bottom edge of the ID document image and an x-axis. The programming instructions can also instruct the at least one processor to rotate the ID document image based on the determined rotated angle, such that an angle between the bottom edge of the rotated ID document image and the x-axis may be within a predefined range. Further, the programming instructions can also instruct the at least one processor to perform image regression on the rotated ID document image to obtain coordinates of four corner points of the rotated ID document image. The programming instructions can also instruct the at least one processor to perform image alignment on the rotated ID document image based on the obtained coordinates of four corner points of the rotated ID document image.

Figure 4:
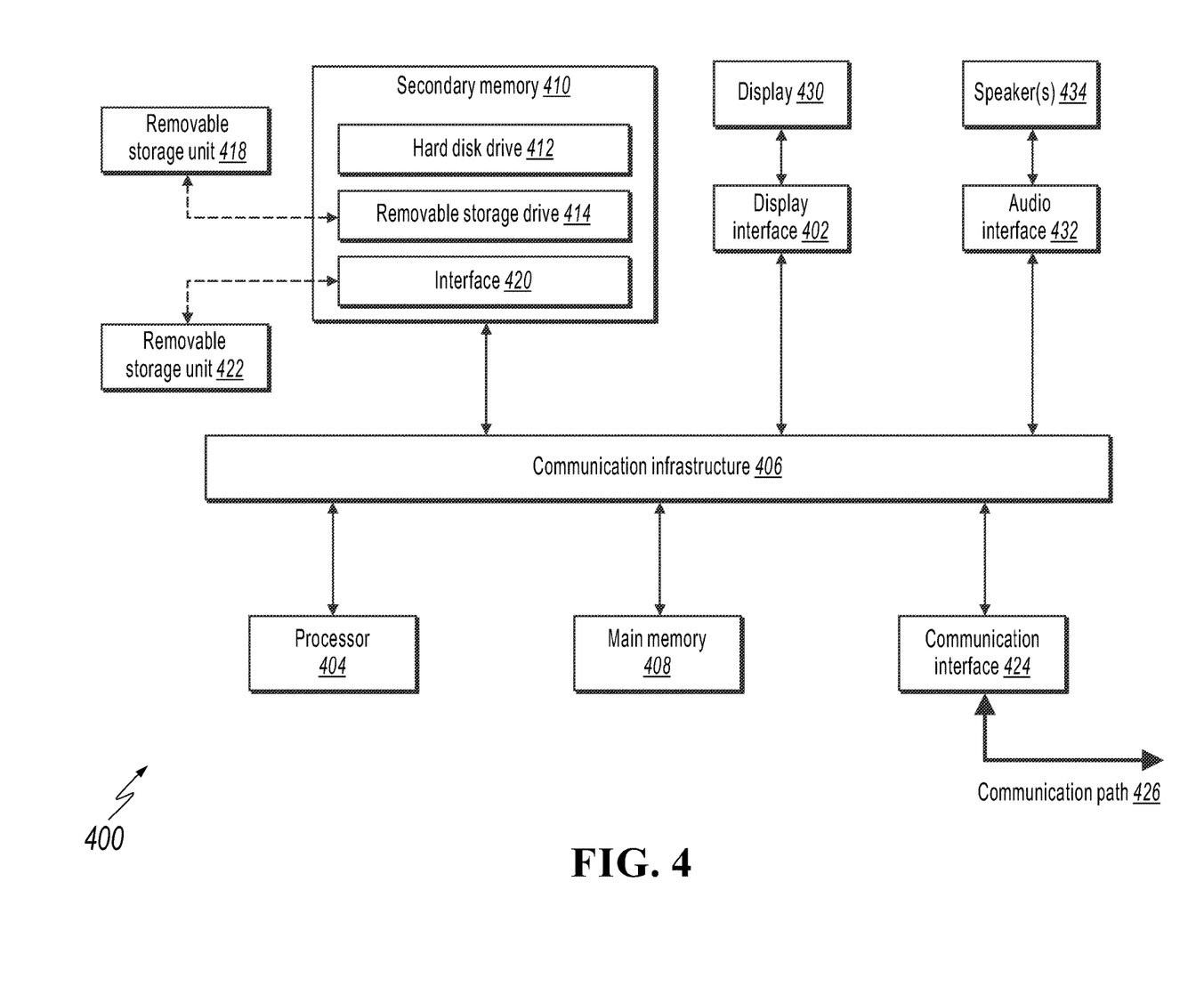
FIG. 4 shows a schematic diagram of a computer system suitable for use in executing at least some steps of the image processing method.

FIG. 4 shows a schematic diagram of a computer system suitable for use in executing at least some steps of the image processing method.

The following description of the computer system/computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a hard disk drive 412 and/or a removable storage drive 414, which may include a magnetic tape drive, an optical disk drive, or the like. The removable storage drive 414 reads from and/or writes to a removable storage unit 418 in a well-known manner. The removable storage unit 418 may include a magnetic tape, optical disk, or the like, which is read by and written to by removable storage drive 414. As will be appreciated by persons skilled in the relevant art(s), the removable storage unit 418 includes a computer readable storage medium having stored therein computer executable program code instructions and/or data.

In an alternative embodiment, the secondary memory 410 may additionally or alternatively include other similar devices for allowing computer programs or other instructions to be loaded into the computing device 400. Such devices can include, for example, a removable storage unit 422 and an interface 420. Examples of a removable storage unit 422 and interface 420 include a removable memory chip (such as an EPROM or PROM) and associated socket, and other removable storage units 422 and interfaces 420 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments, the communication interface 424 permits data to be transferred between the computing device 400 and a data communication network, such as a public data or private data communication network. The communication interface 424 may be used to exchange data between different computing devices 400 which such computing devices 400 form part of an interconnected computer network. Examples of a communication interface 424 can include a modem, a network interface (such as an Ethernet card), a communication port, an antenna with associated circuitry and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface via the communication path 426.

Optionally, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage unit 418, removable storage unit 422, a hard disk installed in hard disk drive 412, or a carrier wave carrying software over communication path 426 (wireless link or cable) to communication interface 424. Computer readable storage media refers to any non-transitory tangible storage medium that provides recorded instructions and/or data to the computing device 400 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the hard disk drive 412, or the interface 420. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

It will be appreciated by a person skilled in the art that numerous variations and/or modifications may be made to the embodiments. The present embodiments are, therefore, to be considered in all respects to be illustrative and not restrictive.

What is claimed is:

1. A computer-implemented method for image processing, comprising:
    determining a rotated angle of an identification (ID) document image, wherein the rotated angle corresponds to an angle between a bottom edge of the ID document image and an x-axis;
    rotating the ID document image based on the rotated angle, wherein an angle is defined between the bottom edge of the rotated ID document image and the x-axis, and wherein a value of the angle is within a predefined range;
    performing image regression on the rotated ID document image to obtain coordinates of four corner points of the rotated ID document image; and
    performing image alignment on the rotated ID document image based on the coordinates of four corner points of the rotated ID document image.

2. The computer-implemented method of claim 1, wherein the rotated angle of the ID document image is determined using a trained angle-determining model.

3. The computer-implemented method of claim 2, wherein the trained angle-determining model is trained using an angle-determining regression task of an angle-determining convolutional neural network.

4. The computer-implemented method of claim 1, wherein the predefined range of the angle between the bottom edge of the rotated ID document image and the x-axis is between −10 degrees and 10 degrees.

5. The computer-implemented method of claim 1, wherein the image regression on the rotated ID document image is performed using a trained document detection model.

6. The computer-implemented method of claim 5, wherein the trained document detection model is trained using a document detection regression task of a document detection convolutional neural network.

7. The computer-implemented method of claim 1, wherein performing image alignment on the rotated ID document image comprises performing an image warping task.

8. A non-transitory computer-readable medium storing one or more instructions executable by a computer system to perform operations for image processing, comprising:
 determining a rotated angle of an identification (ID) document image, wherein the rotated angle corresponds to an angle between a bottom edge of the ID document image and an x-axis;
 rotating the ID document image based on the rotated angle, wherein an angle is defined between the bottom edge of the rotated ID document image and the x-axis, and wherein a value of the angle is within a predefined range;
 performing image regression on the rotated ID document image to obtain coordinates of four corner points of the rotated ID document image; and
 performing image alignment on the rotated ID document image based on the coordinates of four corner points of the rotated ID document image.

9. The non-transitory computer-readable medium of claim 8, wherein the rotated angle of the ID document image is determined using a trained angle-determining model.

10. The non-transitory computer-readable medium of claim 9, wherein the trained angle-determining model is trained using an angle-determining regression task of an angle-determining convolutional neural network.

11. The non-transitory computer-readable medium of claim 8, wherein the predefined range of the angle between the bottom edge of the rotated ID document image and the x-axis is between −10 degrees and 10 degrees.

12. The non-transitory computer-readable medium of claim 8, wherein the image regression on the rotated ID document image is performed using a trained document detection model.

13. The non-transitory computer-readable medium of claim 12, wherein the trained document detection model is trained using a document detection regression task of a document detection convolutional neural network.

14. The non-transitory computer-readable medium of claim 8, wherein performing image alignment on the rotated ID document image comprises performing an image warping task.

15. A computer-implemented system for image processing, comprising:
 one or more computers; and
 one or more computer memory devices interoperably coupled with the one or more computers and having tangible, non-transitory, machine-readable media storing one or more instructions that, when executed by the one or more computers, cause the one or more computers to perform one or more operations comprising:
  determining a rotated angle of an identification (ID) document image, wherein the rotated angle corresponds to an angle between a bottom edge of the ID document image and an x-axis;
  rotating the ID document image based on the rotated angle, wherein an angle is defined between the bottom edge of the rotated ID document image and the x-axis, and wherein a value of the angle is within a predefined range;
  performing image regression on the rotated ID document image to obtain coordinates of four corner points of the rotated ID document image; and
  performing image alignment on the rotated ID document image based on the coordinates of four corner points of the rotated ID document image.

16. The computer-implemented system of claim 15, wherein the rotated angle of the ID document image is determined using a trained angle-determining model.

17. The computer-implemented system of claim 16, wherein the trained angle-determining model is trained using an angle-determining regression task of an angle-determining convolutional neural network.

18. The computer-implemented system of claim 15, wherein the predefined range of the angle between the bottom edge of the rotated ID document image and the x-axis is between −10 degrees and 10 degrees.

19. The computer-implemented system of claim 15, wherein the image regression on the rotated ID document image is performed using a trained document detection model.

20. The computer-implemented system of claim 19, wherein the trained document detection model is trained using a document detection regression task of a document detection convolutional neural network.

* * * * *